US012592245B2

(12) United States Patent
Yan

(10) Patent No.: US 12,592,245 B2
(45) Date of Patent: Mar. 31, 2026

(54) AUDIO GENERATION METHOD, AUDIO GENERATION DEVICE, AND STORAGE MEDIUM

(71) Applicant: Tencent Music Entertainment Technology (Shenzhen) Co., Ltd., Shenzhen (CN)

(72) Inventor: Zhenhai Yan, Shenzhen (CN)

(73) Assignee: Tencent Music Entertainment Technology (Shenzhen) Co., Ltd., Shenzhen (CN)

( * ) Notice: Subject to any disclaimer, the term of this patent is extended or adjusted under 35 U.S.C. 154(b) by 220 days.

(21) Appl. No.: 18/238,184

(22) Filed: Aug. 25, 2023

(65) Prior Publication Data

US 2023/0402054 A1 Dec. 14, 2023

Related U.S. Application Data

(63) Continuation of application No. PCT/CN2021/138568, filed on Dec. 15, 2021.

(30) Foreign Application Priority Data

Feb. 27, 2021 (CN) .......................... 202110221372.7

(51) Int. Cl.
*G10L 25/18* (2013.01)
*G06T 5/92* (2024.01)
(Continued)

(52) U.S. Cl.
CPC ................ *G10L 25/18* (2013.01); *G06T 5/92* (2024.01); *G06T 11/203* (2013.01);
(Continued)

(58) Field of Classification Search
CPC ....... G10L 25/18; G10L 19/018; G10L 13/02; G10L 13/08; G06T 11/206; G06T 5/92; G06T 11/203
See application file for complete search history.

(56) References Cited

U.S. PATENT DOCUMENTS 5,097,326 A * 3/1992 Meijer ...................... A61F 9/08
381/124
6,963,656 B1 * 11/2005 Persaud ............... G09B 21/006
382/190
(Continued)

FOREIGN PATENT DOCUMENTS

CN 105635418 A * 6/2016
CN 106971366 A 7/2017
(Continued)

OTHER PUBLICATIONS

Sainarayanan et al., Fuzzy image processing scheme for autonomous navigation of human blind. Applied Soft Computing 7.1 (Year: 2007).*

(Continued)

*Primary Examiner* — Samuel G Neway
(74) *Attorney, Agent, or Firm* — IP Spring

(57) ABSTRACT

An audio generation method, an audio generation device, and a storage medium are provided. The method includes: receiving an audio generation instruction input by a user, wherein the audio generation instruction is used to indicate a two-dimensional image that the user wants to embed into generated target audio; obtaining a target grayscale image of the two-dimensional image in response to the audio generation instruction; converting grayscale data of each pixel in the target grayscale image into frequency-domain data of each pixel in a spectrogram, to obtain a target spectrogram;

(Continued)

and generating target audio corresponding to the target spectrogram by using the target spectrogram.

17 Claims, 8 Drawing Sheets

(51) Int. Cl.

| | |
|---|---|
| *G06T 11/20* | (2006.01) |
| *G10L 13/02* | (2013.01) |
| *G10L 13/08* | (2013.01) |
| *G10L 19/08* | (2013.01) |

(52) U.S. Cl.
CPC ............ *G06T 11/206* (2013.01); *G10L 13/02* (2013.01); *G10L 13/08* (2013.01); *G10L 19/08* (2013.01)

(56) References Cited

U.S. PATENT DOCUMENTS

| | | | |
|---|---|---|---|
| 2004/0260540 A1 | 12/2004 | Zhang | |
| 2013/0322651 A1* | 12/2013 | Cheever | H03G 5/165 |
| | | | 381/101 |
| 2014/0185862 A1* | 7/2014 | Kamath | G06Q 20/3829 |
| | | | 382/100 |
| 2018/0239821 A1* | 8/2018 | Summers, II | G06F 16/248 |
| 2018/0247624 A1* | 8/2018 | Elkins | G10H 1/0025 |
| 2019/0348062 A1 | 11/2019 | Gao et al. | |
| 2023/0306937 A1* | 9/2023 | Vitaletti | G03B 15/07 |
| 2023/0402054 A1* | 12/2023 | Yan | G10L 19/018 |

FOREIGN PATENT DOCUMENTS

| | | | |
|---|---|---|---|
| CN | 108615006 | A | 10/2018 |
| CN | 111048071 | A | 4/2020 |
| CN | 111312287 | A | 6/2020 |
| CN | 111489762 | A | 8/2020 |
| CN | 111862932 | A | 10/2020 |
| CN | 112151048 | A | 12/2020 |
| CN | 112188115 | A | 1/2021 |
| DE | 10214431 | A1 | 10/2003 |

OTHER PUBLICATIONS

Akti et al., "Frequency component extraction from color images for specific sound transformation and analysis." 2012 3rd International Conference on Image Processing Theory, Tools and Applications (IPTA). IEEE (Year: 2012).*

Krishnan et al., "Image recognition for visually impaired people by sound." 2013 International Conference on Communication and Signal Processing. IEEE (Year: 2013).*

Saldaña et al., "Deep Learning for Image to Sound Synthesis." 2020 17th International Conference on Electrical Engineering, Computing Science and Automatic Control (CCE). IEEE (Year: 2020).*

WIPO, International Search Report and Written Opinion for International Application No. PCT/CN2021/138568, Mar. 9, 2022, 13 pages.

CNIPA, First Office Action for Chinese Patent Application No. 202110221372.7, Apr. 28, 2023, 18 pages.

* cited by examiner

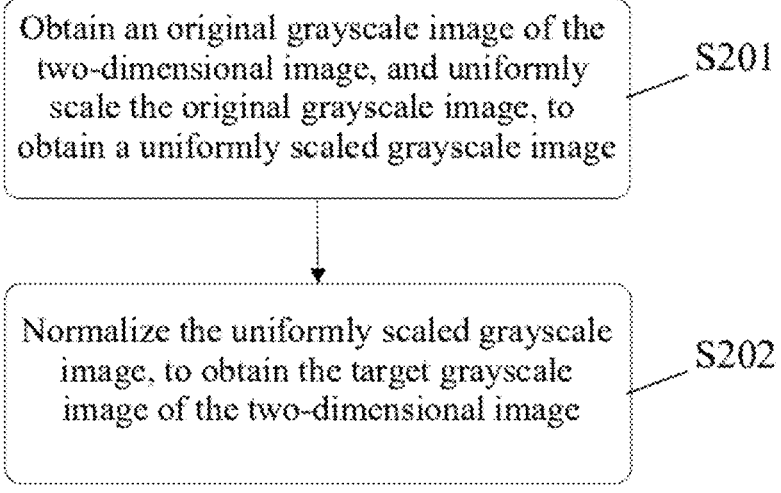

Obtain an original grayscale image of the two-dimensional image, and uniformly scale the original grayscale image, to obtain a uniformly scaled grayscale image — S201

Normalize the uniformly scaled grayscale image, to obtain the target grayscale image of the two-dimensional image — S202

FIG. 2

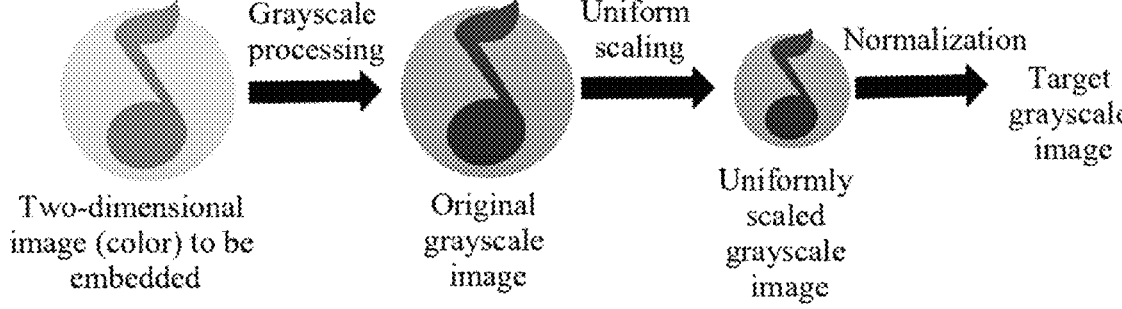

Grayscale processing

Uniform scaling

Normalization

Target grayscale image

Two-dimensional image (color) to be embedded

Original grayscale image

Uniformly scaled grayscale image

FIG. 3

Target spectrogram

Frequency-domain data in multiple frames

Time-domain signals in multiple frames

Audio signal of target audio

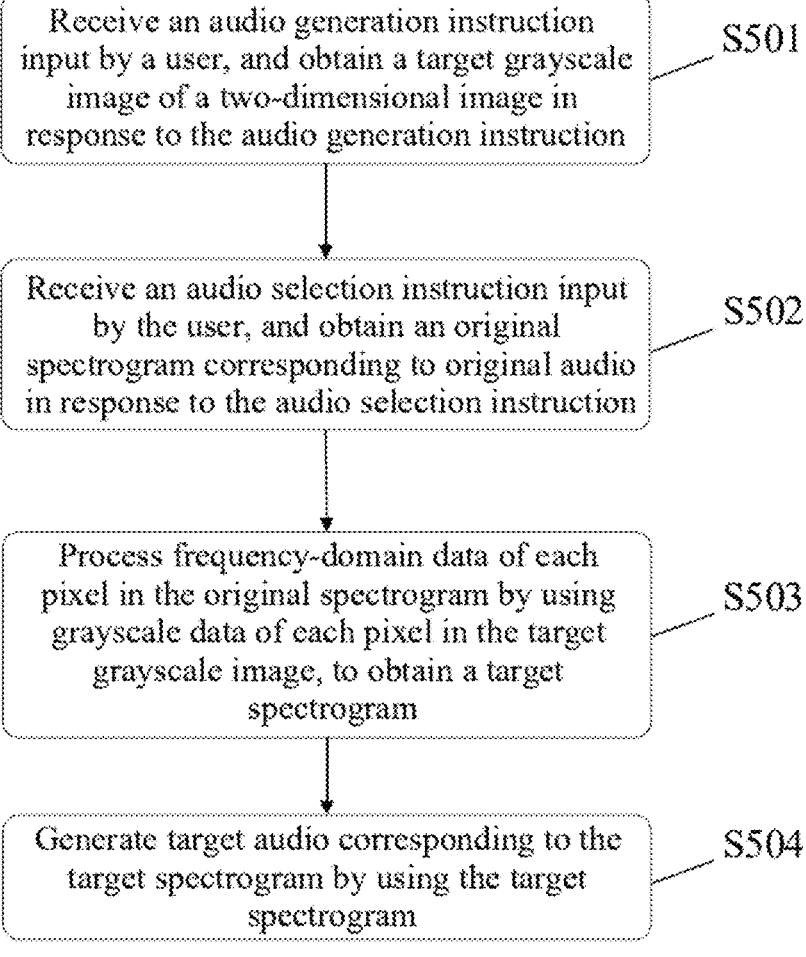

Receive an audio generation instruction input by a user, and obtain a target grayscale image of a two-dimensional image in response to the audio generation instruction — S501

Receive an audio selection instruction input by the user, and obtain an original spectrogram corresponding to original audio in response to the audio selection instruction — S502

Process frequency-domain data of each pixel in the original spectrogram by using grayscale data of each pixel in the target grayscale image, to obtain a target spectrogram — S503

Generate target audio corresponding to the target spectrogram by using the target spectrogram — S504

FIG. 5

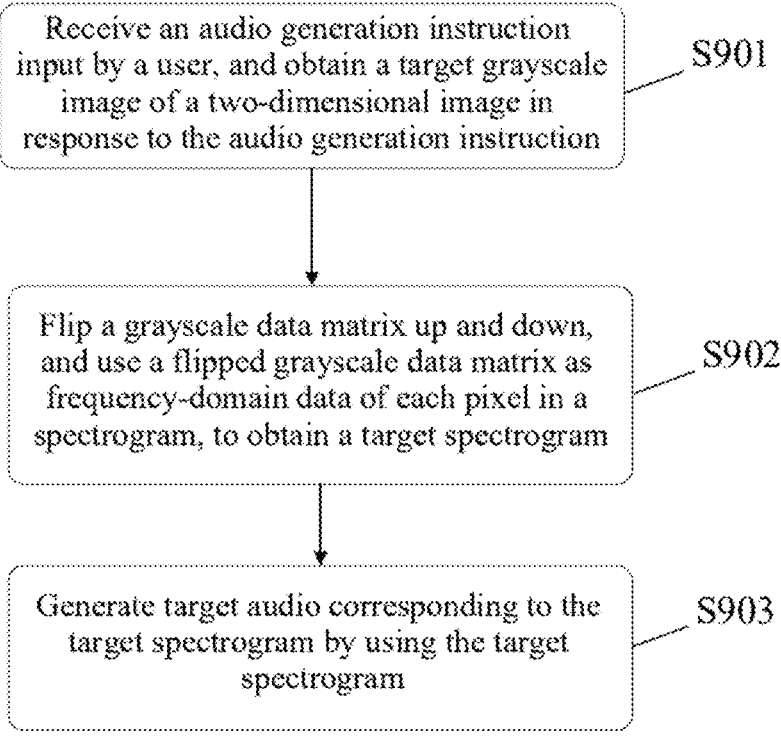

Receive an audio generation instruction input by a user, and obtain a target grayscale image of a two-dimensional image in response to the audio generation instruction — S901

Flip a grayscale data matrix up and down, and use a flipped grayscale data matrix as frequency-domain data of each pixel in a spectrogram, to obtain a target spectrogram — S902

Generate target audio corresponding to the target spectrogram by using the target spectrogram — S903

FIG. 9

AUDIO GENERATION METHOD, AUDIO GENERATION DEVICE, AND STORAGE MEDIUM

CROSS-REFERENCE TO RELATED APPLICATION(S)

This application a continuation under 35 U.S.C. § 120 of International Application No. PCT/CN2021/138568, filed Dec. 15, 2021, which claims priority under 35 U.S.C. § 119(a) and/or PCT Article 8 to Chinese Patent Application No. 202110221372.7, filed on Feb. 27, 2021. The entire disclosures of International Application No. PCT/CN2021/138568 and Chinese Patent Application No. 202110221372.7 are hereby incorporated by reference.

TECHNICAL FIELD

The present application relates to the field of audio processing technologies, and in particular, to an audio generation method, an audio generation device, and a storage medium.

BACKGROUND

Currently, there are some scenarios in which a picture is associated with an audio. For example, the picture is directly used as a cover for an audio file, and then the picture and the audio are stored in a new file format, so that the picture can be directly displayed when a user plays the audio. In this manner, the picture is only used as a cover picture for the audio, and there is a relatively low correlation between the picture and the audio, and the practicability is relatively poor.

SUMMARY

In a first aspect, an audio generation method is provided. The method includes: receiving an audio generation instruction input by a user, where the audio generation instruction is used to indicate a two-dimensional image that the user wants to embed into generated target audio; obtaining a target grayscale image of the two-dimensional image in response to the audio generation instruction; converting grayscale data of each pixel in the target gray scale image into frequency-domain data of each pixel in a spectrogram, to obtain a target spectrogram; and generating target audio corresponding to the target spectrogram by using the target spectrogram.

In a second aspect, an audio generation device is provided. The device includes: a memory configured to store computer programs, and a processor configured to invoke the computer programs stored in the memory to: receive an audio generation instruction input by a user, wherein the audio generation instruction is used to indicate a two-dimensional image that the user wants to embed into generated target audio, obtain a target grayscale image of the two-dimensional image in response to the audio generation instruction, convert grayscale data of each pixel in the target grayscale image into frequency-domain data of each pixel in a spectrogram, to obtain a target spectrogram, and generate target audio corresponding to the target spectrogram by using the target spectrogram.

In a third aspect, a non-transitory computer storage medium is provided. The non-transitory computer storage medium includes computer programs which, when running on an electronic device, are operable with the electronic device to: receive an audio generation instruction input by a user, wherein the audio generation instruction is used to indicate a two-dimensional image that the user wants to embed into generated target audio, obtain a target grayscale image of the two-dimensional image in response to the audio generation instruction, convert grayscale data of each pixel in the target grayscale image into frequency-domain data of each pixel in a spectrogram, to obtain a target spectrogram, and generate target audio corresponding to the target spectrogram by using the target spectrogram.

BRIEF DESCRIPTION OF THE DRAWINGS

In order to more clearly describe the technical solutions in the embodiments of the present application or the prior art, the drawings necessary for describing the embodiments or the prior art will be briefly described below. Apparently, the drawings in the description below merely show some of the embodiments of the present application, and those of ordinary skill in the art would have obtained other drawings from these drawings without involving any inventive effort.

FIG. 2 is a schematic flowchart of obtaining a target grayscale image according to an embodiment of the present application;

FIG. 3 is a schematic diagram of an effect of image processing according to an embodiment of the present application;

FIG. 5 is a schematic flowchart of another audio generation method according to an embodiment of the present application;

FIG. 9 is a schematic flowchart of still another audio generation method according to an embodiment of the present application;

DETAILED DESCRIPTION OF EMBODIMENTS

The technical solutions in the embodiments of the present application will be clearly and completely described below in conjunction with the accompanying drawings in the embodiments of the present application.

In the embodiments of the present application, audio can be embedded with image information, for example, a spectrogram is modified or constructed based on the image information, to obtain audio with the image information. In this way, the correlation between the image and the audio is increased, and a user can intuitively perceive the audio with the image information.

In the present application, the spectrogram may be a speech spectrogram. A horizontal coordinate of the spectrogram may be time, and a vertical coordinate of the spectrogram may be frequency. A value of each coordinate point may represent the magnitude of an energy value of speech data, and a column of data corresponding to each time point in the spectrogram represents frequency-domain data corresponding to an audio signal in a frame. The magnitude of the energy value of the speech data is usually represented by the shade of color, and a darker color may represent a larger energy value. Alternatively, the magnitude of the energy value of the speech data may be represented in other manners. This is not limited in the present application.

An audio generation solution involved in the present application can be applied to an audio generation device, for example, may be specifically applied to various types of audio software installed in the audio generation device, including, but not limited to, music playback software, audio editing software, and audio conversion software. The audio generation device may be a terminal, or a server, or other devices, which is not limited in the present application. Optionally, the terminal herein may include, but is not limited to: a smartphone, a tablet computer, a laptop, and a desktop.

Based on the foregoing descriptions, according to an audio generation method, apparatus, and device, and a medium provided in the embodiments of the present application, audio with image information can be obtained by modifying or constructing a spectrogram by using the image information. In this way, audio is embedded with the image information, so that an image has a sounding function, and the audio may also include the image information, thereby greatly increasing the relevance between the audio and the image. The detailed description will be given below separately.

Figure 1:
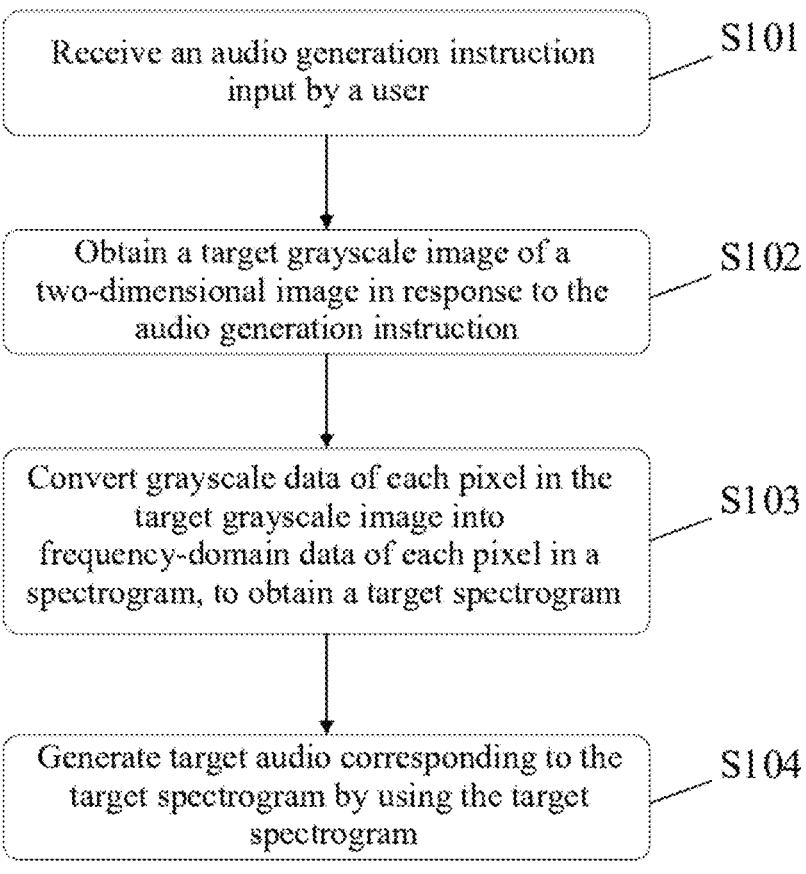
FIG. 1 is a schematic flowchart of an audio generation method according to an embodiment of the present application.

Referring to FIG. 1, FIG. 1 is a schematic flowchart of an audio generation method according to an embodiment of the present application. A procedure shown in FIG. 1 may include steps S101 to S104 as follows.

In S101, an audio generation instruction input by a user is received.

The audio generation instruction may be used to indicate a two-dimensional image that the user wants to embed into generated target audio. The two-dimensional image may be an existing image that is stored in a picture format, may be content created in a temporary creation area, or may be multiple two-dimensional images for acquisition of a user action change. If content that the user wants to embed in the generated target audio is a file in a non-picture format such as a text or a table, the file in the non-picture format may be converted into a picture format, and then an image converted into the picture format is embedded into the target audio. The picture format may be a still image file format, such as jpg, png, bmp, or jpeg, which is not limited herein. For example, a file that needs to be embedded into the target audio is obtained, and a suffix name of the file is determined. If the file is not in the picture format, for example, is in a file format such as vsd, xls, or doc, the file format is converted into a picture format.

In S102, a target grayscale image of the two-dimensional image is obtained in response to the audio generation instruction.

The target grayscale image may be obtained by obtaining the two-dimensional image and processing the two-dimensional image, or a processed grayscale image may be directly obtained from a memory and used as the target grayscale image. This is not limited in the present application. Optionally, the target grayscale image may also be referred to as a target grayscale picture, target grayscale information, a target grayscale matrix, etc. The target grayscale image may be a grayscale data matrix, a block diagram with a pixel value, etc. A value of each location in the target grayscale image may be referred to as a grayscale value, a pixel value, etc. This not limited herein.

In a possible implementation, obtaining the two-dimensional image and processing the two-dimensional image may include operations of: obtaining an original grayscale image of the two-dimensional image, uniformly scaling the original grayscale image, performing histogram equalization on the original grayscale image, normalizing the original grayscale image, etc. For example, as shown in FIG. 2, obtaining the target grayscale image of the two-dimensional image may include steps S201 and S202 as follows.

In S201, an original grayscale image of the two-dimensional image is obtained, and the original grayscale image is scaled uniformly to obtain a uniformly scaled grayscale image.

The original grayscale image of the two-dimensional image may refer to a concept of a grayscale map in the field of image processing. There are 256 grayscale levels for each pixel in an image, 255 representing all-white, and 0 representing all-black. For example, an original grayscale image obtained through grayscale processing of a two-dimensional image is (0, 100, 123; 215, 124, 165; 255, 65, 98). For ease of understanding, herein, the original grayscale image of the two-dimensional image is denoted as GrayP1, and a height of the original grayscale image is denoted as H1.

In a possible implementation, the uniform scaling may be performed using a scale. The uniform scaling is intended to adjust the height H1 of the original grayscale image GrayP1 of the two-dimensional image, to obtain the uniformly scaled grayscale image. For ease of understanding, the uniformly scaled grayscale image is denoted as GrayP2, and a height of GrayP2 is denoted as H2. It should be noted that the height H2 of the uniformly scaled grayscale image is a preset value, and a uniform scale may be calculated based on the height H2 of the uniformly scaled grayscale image and the height H1 of the original grayscale image of the two-dimensional image, for example, scale=H2/H1. After a corresponding uniform scale is determined, the original grayscale image may be adjusted to a proper size in equal proportions by using the uniform scale, so that original audio is modified or constructed by using a finally generated target grayscale image, to obtain the target audio. Optionally, the height H2 of the uniformly scaled grayscale image GrayP2 may be $2^N+1$, where N is a preset positive integer. The height H2 of the uniformly scaled grayscale image may be determined based on a height of a target spectrogram corresponding to the target audio that needs to be generated for the user, or may be determined based on frequency-domain data of an original spectrogram, or may be determined based on a screen size and/or resolution of a device, or may be determined in other manners. This is not limited in the present application.

In S202, the uniformly scaled grayscale image is normalized to obtain the target gray scale image of the two-dimensional image.

The normalization of the uniformly scaled grayscale image may involve: traversing all values of the uniformly scaled gray scale image GrayP2, to find a maximum value max (GrayP2) of GrayP2, and normalizing all data to obtain the target grayscale image of the two-dimensional image. For ease of understanding, the target grayscale image is denoted as GrayP3, and GrayP3 is a grayscale data matrix, that is:

GrayP3=GrayP2/max(GrayP2).

For example, if GrayP2 is (20, 30, 40; 50, 60, 70; 80, 90, 100), after normalization, the target grayscale image GrayP3 is (0.2, 0.3, 0.4; 0.5, 0.6, 0.7; 0.8, 0.9, 1). After steps S201 and S202, the grayscale data matrix GrayP3 of the target grayscale image of the two-dimensional image is obtained, where all data of GrayP3 are between 0 and 1. As shown in FIG. 3, FIG. 3 is a diagram of an effect of image processing. Grayscale conversion is performed on a color image to obtain an original grayscale image of a two-dimensional image, the original grayscale image is uniformly scaled to obtain a uniformly scaled grayscale image, and the uniformly scaled grayscale image is then normalized to obtain a target gray scale image of the two-dimensional image.

In a possible implementation, histogram equalization may be further performed on the uniformly scaled grayscale image GrayP2, to enhance the contrast of data at different locations in GrayP2, thereby improving picture quality. In a specific embodiment, a function may be directly called for processing, such as a histeq function in MATLAB or an equalizeHist function in opencv. Then, the grayscale image having subjected to histogram equalization may be normalized to obtain the target grayscale image of the two-dimensional image.

It should be noted that if the two-dimensional image meets processing result criteria for steps S201 and S202, there is no need to perform operations in steps S201 and S202 on the two-dimensional image, and the two-dimensional image is directly used as the target gray scale image.

In an implementation, the two-dimensional image may include multiple two-dimensional images for acquisition of a user action change. The user action change may be a change in gestures, facial expressions, etc. of a user, which is not limited herein. Obtaining the target grayscale image of the two-dimensional image may include the following steps: respectively calculating a grayscale difference between two-dimensional images corresponding to adjacent acquisition times in the multiple two-dimensional images, to obtain multiple grayscale differences; and arranging the multiple grayscale differences according to acquisition times corresponding to the grayscale differences, to obtain the target grayscale image. The multiple two-dimensional images may be acquired from a video photographed in real time, or from a video stored in an audio generation device such as a terminal or another storage device, or from multiple continuously photographed images, which is not limited herein. The grayscale difference may be a difference between target grayscale images corresponding to the two-dimensional images corresponding to adjacent acquisition times. For example, there are multiple two-dimensional images in a video. One two-dimensional image is acquired at time points t1, t2, and t3, respectively, such that three two-dimensional images P1, P2, and P3 are obtained. According to steps S201 and S202, target grayscale images of the three two-dimensional images are obtained; a grayscale difference between P1 and P2 and a grayscale difference between P2 and P3 are calculated; and the two grayscale differences are arranged according to the acquisition times, for example, the grayscale difference between P1 and P2 is arranged before the grayscale difference between P2 and P3, that is, at a left location, to obtain target grayscale images corresponding to the multiple two-dimensional images for acquisition of the user action change.

In S103, grayscale data of each pixel in the target grayscale image is converted into frequency-domain data of each pixel in a spectrogram, to obtain a target spectrogram. In this embodiment of the present application, the target spectrogram is obtained mainly in two manners. In one implementation, an original spectrogram of original audio is modified based on the target grayscale image of the two-dimensional image, to obtain the target spectrogram. For example, the original spectrogram of the original audio may be weighted by using the target grayscale image such as the grayscale data matrix GrayP3 as a weighting factor, to obtain the target spectrogram. In the other implementation, a target spectrogram of audio is established (constructed) based on the target grayscale image of the two-dimensional image, to directly obtain target audio by using the target grayscale image. For example, the grayscale data matrix GrayP3 may be directly used as frequency-domain data, to obtain the target spectrogram. In this way, a spectrogram of audio is modified or constructed to obtain audio with image information, so that an image can be closely associated with audio, thereby greatly increasing the relevance between the audio and the image.

In S104, target audio corresponding to the target spectrogram is generated by using the target spectrogram.

The target audio is generated audio into which image information such as information of the above two-dimensional image is embedded. Optionally, generating the target audio corresponding to the target spectrogram by using the target spectrogram may include the following steps: obtaining a time-domain signal corresponding to frequency-domain data in each frame of the target spectrogram; and obtaining the target audio based on the time-domain signal corresponding to the frequency-domain data in each frame. For example, the frequency-domain data in each frame of the target spectrogram may be flipped up and down, and a complex number in a flipped frequency-domain data may be conjugated (in other words, conjugate of the complex number in the flipped frequency-domain data may be taken to replace the complex number); and an inverse Fourier transform may be performed on the conjugated frequency-domain data in each frame, to obtain a time-domain signal corresponding to the frequency-domain data in each frame, and time-domain signals in all frames are synthesized into the target audio.

In a possible implementation, because the frequency-domain data of the target spectrogram is conjugate symmetric, when the frequency-domain data of the target spectrogram is synthesized into a time-domain signal, if frequency-domain data in each frame of the spectrogram includes $2^N-1$ pieces of data, only the $2^{nd}$ to $(2^N/2)^{th}$ pieces of data in the frequency-domain data need to be flipped up and down, and a complex number in flipped frequency-domain data is conjugated, where N is a positive integer. For example, if the frequency-domain data in each frame of the target spectrogram includes 1025 pieces of data, only the $2^{nd}$ to $512^{th}$ pieces of data need to be flipped up and down, and a complex number in flipped frequency-domain data is conjugated. Then, an inverse Fourier transform may be performed on the conjugated frequency-domain data in each frame, to obtain a time-domain signal corresponding to the frequency-domain data in each frame. In this way, the frequency-domain data in each frame of the target spectrogram is converted into a time-domain signal.

Figure 4:
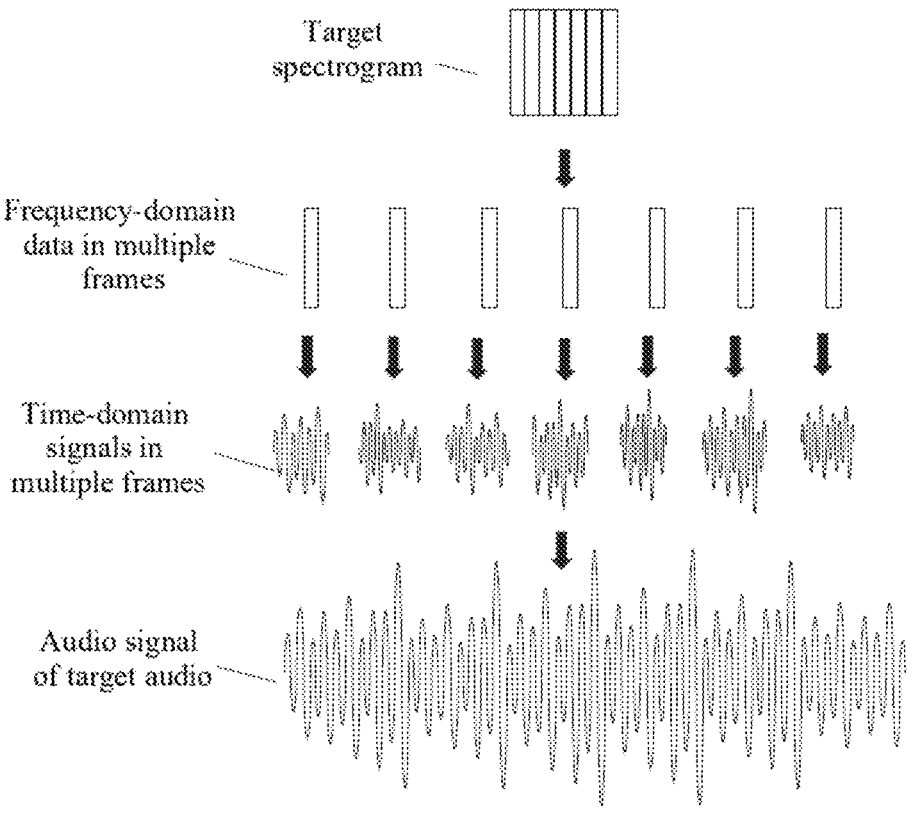
FIG. 4 is a schematic flowchart of synthesizing audio based on a target spectrogram according to an embodiment of the present application.

After the time-domain signal corresponding to the frequency-domain data in each frame of the target spectrogram is obtained, time-domain signals in all frames may be aliased and concatenated according to a specific aliasing rate, to obtain a complete audio signal. Audio represented by the audio signal may be referred to as target audio, in order to be distinguished from other audio. The target audio is embedded with image information, and the user can intuitively perceive a change brought about by the image information to the original audio or a unique sound directly including the image information. The process of step S104 is as shown in FIG. 4. The target spectrogram is composed of frequency-domain data in multiple frames, frequency-domain data in each frame is converted into a corresponding time-domain signal, and time-domain signals in multiple frames are aliased and concatenated to obtain the audio signal.

In a possible implementation, after the target audio is obtained, an audio playback instruction input by the user is received; and the target audio is played in response to the audio playback instruction, and according to a playback progress of the target audio, a target spectrogram with an area corresponding to the playback progress is displayed. In this way, when the target audio is playing, an embedded image is gradually displayed in association with the playback progress of the audio. For example, it is possible to play the target audio upon reception of a playback instruction for the target audio. When the target audio is playing to a time point t1, a target spectrogram with a corresponding area between and t1 is displayed; when the target audio is played to a time point t2, a target spectrogram with a corresponding area between 0 and t2 is displayed; and when the target audio has finished playing, a complete target spectrogram is displayed. Optionally, it is also possible to share the target audio with a target object upon reception of a sharing instruction for the target audio. The target object may be a contact, or may be a functional module in application software, which is not limited herein.

With the method shown in FIG. 1, the target audio with image information may be obtained. When the target audio is playing, the target spectrogram of the target audio may be gradually displayed with playing of music, so that the user can intuitively see the embedded image information. The obtained target audio may also be shared with other users. For example, in music playback software, the user imports a picture a and a segment of audio b from a terminal. After processing of this embodiment, audio c embedded with the image a may be obtained. When the audio c is playing, a spectrogram of the audio may be gradually displayed with playing of music, so that the user can intuitively see embedded image information.

For another example, in music playback software, the user photographs a dynamically changing video by using a camera of a terminal. After processing of this embodiment, multiple two-dimensional images that indicate a user action change are captured from the dynamically changing video and then processed to obtain audio d, where the audio d presents a sound effect brought about by a dynamic change.

In this embodiment of the present application, the technical solution is described as a whole. In the present application, audio may be obtained based on image information in two manners, which mainly differ in terms of the mode of obtaining the target spectrogram. In one manner, the audio is obtained by modifying the spectrogram based on the target grayscale image. In the other manner, the audio is obtained by constructing the spectrogram by using the target grayscale image. In this way, the target audio may be obtained by modifying or constructing the spectrogram. The audio is embedded with the image information, and the image information is closely combined with the audio, so that the image has a sounding function, and a sound also includes the image information. That the sound includes the image information means that the spectrogram of the audio includes the image information. In this embodiment of the present application, the audio can be embedded with the image information, so that the image has a sounding function, and the audio may also include the image information, thereby greatly increasing the relevance between the audio and the image. Moreover, the operation process is highly flexible and interesting.

Refer to FIG. 5, which is a schematic flowchart of another audio generation method according to an embodiment of the present application. As shown in FIG. 5, in the audio generation method, a spectrogram of audio is modified based on a target grayscale image of a two-dimensional image, to obtain a target spectrogram, so as to obtain target audio. The method includes steps S501 to S504 as follows.

In S501, an audio generation instruction input by a user is received, and a target grayscale image of the two-dimensional image is obtained in response to the audio generation instruction.

For this step, reference is made to related descriptions of steps S101 and S102, which will not be repeated herein.

In this embodiment of the present application, a spectrogram of original audio may be modified based on the target grayscale image of the two-dimensional image, to obtain the target spectrogram. In this case, when uniform scaling is performed on an original grayscale image of the two-dimensional image, a height of the original grayscale image can be uniformly scaled to be the same as a height of an original spectrogram.

In S502, an audio selection instruction input by the user is received, and an original spectrogram corresponding to the original audio is obtained in response to the audio selection instruction.

Figure 6:
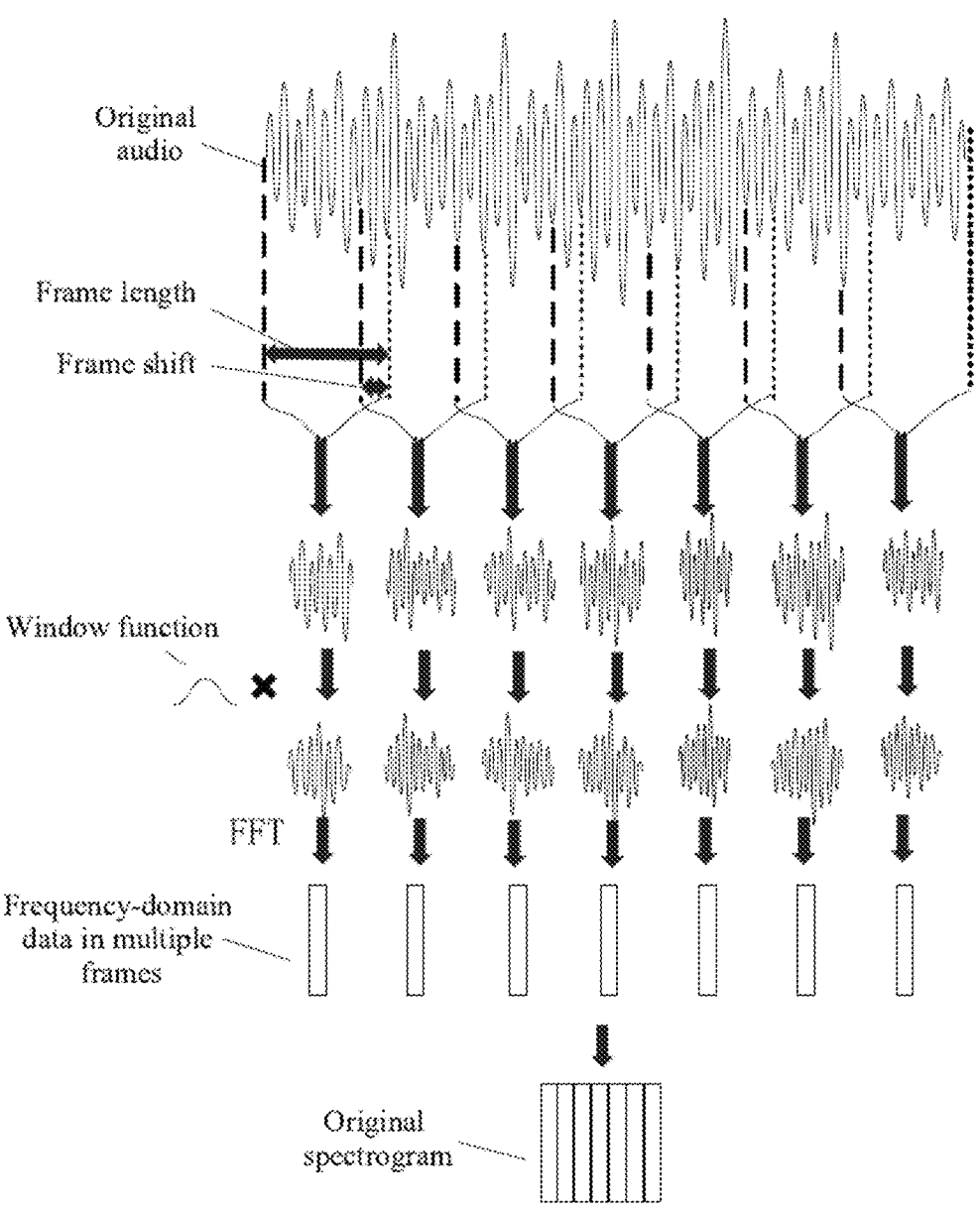
FIG. 6 is a schematic flowchart of a method for obtaining an original spectrogram according to an embodiment of the present application.

The audio selection instruction is used to indicate an original audio required to generate the target audio. Optionally, the original audio may be a locally stored audio file, or may be a temporarily downloaded audio file on other storage devices. Content of the audio file may be music, conversations, noise, etc., which is not limited in the present application. In a specific implementation process, the process of obtaining the original spectrogram based on the original audio may be as shown in FIG. 6. For example, a time-domain signal of the original audio may be framed to obtain time-domain signals in multiple frames. A frame length is a length of time for each frame, and a frame shift is a length of time when two adjacent frames overlap. For example, if a start time of a time-domain signal in the $k^{th}$ frame is t and an end time of the time-domain signal is t+E, and a start time of a time-domain signal in the $(k+1)^{th}$ frame is t+L and an end time of the time-domain signal is t+E+L, the frame length is E, and the frame shift is L. The time-domain signal in each frame is windowed. A length of a window function should be consistent with a length of a frame length. The window function may be a Hanning window, a rectangular window, a triangular window, a Hamming window, a Gaussian window, etc. A fast Fourier transform (FFT) is performed on the windowed time-domain signal in each of the multiple frames, to obtain frequency-domain data in multiple frames. The pieces of frequency-domain data in all the frames are arranged in a form of a column vector, to obtain the original spectrogram. For example, during arrangement, all pieces of frequency-domain data are gradually increased from bottom to top in terms of frequency, and then placed horizontally in a time sequence, to obtain the original spectrogram. A horizontal axis of the original spectrogram is time, a vertical axis of the original spectrogram is frequency, a value of a coordinate point is an energy value, and the magnitude of the energy value is represented by the shade of color. Optionally, when a fast Fourier transform (FFT) is performed on the windowed time-domain signal in each frame, to obtain frequency-domain data in multiple frames, if the windowed time-domain signal in each frame has $2^K$ values, the time complexity of the Fourier transform can be reduced to improve the computation efficiency of the Fourier transform. Correspondingly, frequency-domain data corresponding to a time-domain signal in each frame has $(2^K/2)+1$ values, where K is a positive integer. Alternatively, in other words, if a time-domain signal in each frame has $2^{(N+1)}$ values, corresponding frequency-domain data in each frame obtained has $2^N+1$ values. N is an integer greater than or equal to 0. In S503, frequency-domain data of each pixel in the original spectrogram is processed by using grayscale data of each pixel in the target grayscale image, to obtain the target spectrogram.

The grayscale data of each pixel in the target grayscale image may be represented by using a grayscale data matrix. In the grayscale data matrix, each value represents a value of a pixel at a corresponding location in the target grayscale image. In a possible implementation, processing the frequency-domain data of each pixel in the original spectrogram by using the grayscale data of each pixel in the target grayscale image, to obtain the target spectrogram may include the following operations: flipping the grayscale data matrix up and down; and weighting the frequency-domain data of each pixel in the original spectrogram by using a flipped grayscale data matrix as a weighting factor, to obtain the target spectrogram.

In a specific implementation process, up-down flipping may indicate flipping of the grayscale data matrix up and down in a Y-axis direction. For example, if the grayscale data matrix is (0.1, 0.2, 0.3; 0.4, 0.5, 0.6; 0.7, 0.8, 0.9), the grayscale data matrix flipped up and down is (0.7, 0.8, 0.9; 0.4, 0.5, 0.6; 0.1, 0.2, 0.3).

Figure 7A:
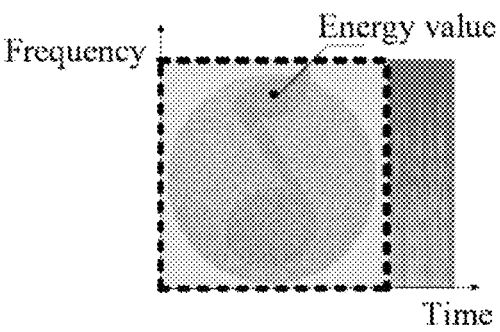
FIG. 7A is a schematic diagram of an effect of a target spectrogram according to an embodiment of the present application.

Optionally, weighting the frequency-domain data of each pixel in the original spectrogram by using the weighting factor makes it possible to weight all data of the frequency-domain data. However, the frequency-domain data of the original spectrogram is conjugate symmetric. If the frequency-domain data includes $2^N+1$ pieces of data, only the $2^{nd}$ to $(2^N/2+1)^{th}$ piece of data of the frequency-domain data need to be weighted. In this way, all the data of the frequency-domain data can be weighted. An effect of the obtained target spectrogram is as shown in FIG. 7A, in which the part enclosed by a dashed box is an embedded two-dimensional image, and the part outside the dashed box is the frequency-domain data of the original spectrogram. A horizontal axis of the original spectrogram is time, a vertical axis of the original spectrogram is frequency, and the shade of color represents the magnitude of an energy value of a corresponding coordinate point. It can be learned that a height of the embedded two-dimensional image is equal to the height of the original spectrogram, because the height of the original grayscale image is scaled to be the same as the height of the original spectrogram in step S501.

Figure 7B:
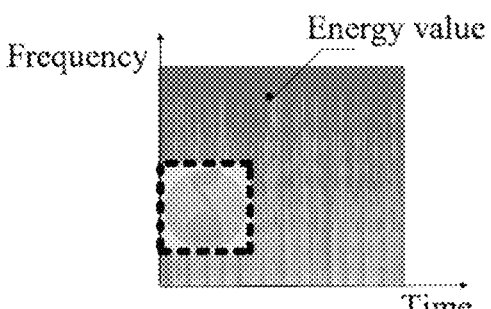
FIG. 7B is a schematic diagram of an effect of another target spectrogram according to an embodiment of the present application.

Optionally, the flipped grayscale data matrix may be downsampled to reduce a size of the grayscale data matrix, and part of frequency-domain data of the original spectrogram is weighted by using a downsampled grayscale data matrix as a weighting factor, to obtain the target spectrogram. In this way, the two-dimensional image can be embedded in part of the original spectrogram. For example, if the frequency-domain data includes $2^N+1$ pieces of data, a height of the grayscale data matrix includes $2^N+1$ pixels, the grayscale data matrix is downsampled, and a downsampling factor is ½, the height of the grayscale data matrix becomes $2^N/2+1$, and the $M^{th}$ to $(M+2^N/2+1)^{th}$ pieces of data of the frequency-domain data may be weighted, so that only the $M^{th}$ to $(M+2^N/2+1)^{th}$ pieces of data of the frequency-domain data in the obtained target spectrogram include image information, where M and N are positive integers. An effect of the target spectrogram obtained in this step may be as shown in FIG. 7B, in which the part enclosed by a dashed box is an embedded image, and the part outside the dashed box is frequency-domain data of the original spectrogram. A horizontal axis of the original spectrogram is time, a vertical axis of the original spectrogram is frequency, and the shade of color represents the magnitude of an energy value of a corresponding coordinate point. It can be learned that a height of the embedded two-dimensional image is not equal to the height of the original spectrogram, and the embedded image only exists in part of the original spectrogram. If the weighting factor is scaled to a smaller value, after the original spectrogram is weighted, the embedded information may have little impact on the original audio, and synthesized target audio is basically the same as the original audio. In this way, the image information can be imperceptively embedded in the target audio.

In S504, target audio corresponding to the target spectrogram is generated by using the target spectrogram.

For descriptions of this step, reference may be made to step S104, in which when time-domain signals in all frames are synthesized into audio, an aliasing rate may be determined based on the frame shift and the frame length for framing in step S502, for example, it may be a ratio of the frame shift to the frame length during framing, so that the part of the original spectrogram that is not weighted is synthesized into audio. For example, if the frame length is 2W and the frame shift is W during framing, a value of the aliasing rate should be W/2W, that is, 50%. The time-domain signals in all frames may be aliased and concatenated together, to obtain a complete audio signal, that is, the target audio.

In this embodiment of the present application, upon obtaining the target spectrogram, the frequency-domain data of the original spectrogram is weighted by using the grayscale data matrix as a weighting factor, to obtain the target spectrogram; a Fourier transform is performed on frequency-domain data in each frame of the target spectrogram, to obtain a time-domain signal; and time-domain signals are then aliased and concatenated to finally obtain the target audio. In other words, audio is obtained by modifying the original spectrogram. It can be learned that obtaining the target audio by modifying the original spectrogram makes it possible that the audio can be embedded with an image, so that the image has a sounding function, and the audio may also include image information, thereby greatly increasing the relevance between the audio and the image.

Figure 8A:
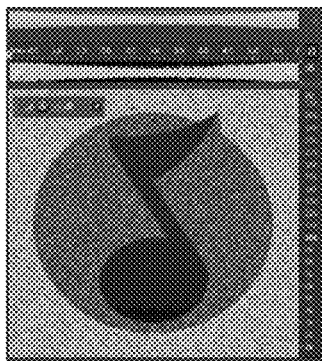
FIG. 8A is an instance diagram of a target spectrogram according to an embodiment of the present application.
Figure 8B:
FIG. 8B is an instance diagram of another target spectrogram according to an embodiment of the present application.

Hereinafter, by taking the case where the method proposed in this embodiment of the present application is applied to music playback software to create an image and modify an original spectrogram, to obtain new audio as an example, the method described in this embodiment is explained. The music playback software herein includes, but is not limited to, software on a mobile terminal, on a computer terminal, etc. In music playback software, there is provided a temporary creation area in which a user creates content and saves the created content in a picture format, and the user also selects an audio file that the user wants to modify. The processing in step S501 is performed on a created image, to obtain a target grayscale image, where a height of the target grayscale image is scaled to include $2^10+1$ pixels, and the data is set such that it corresponds to a height of an original spectrogram. In addition, an original spectrogram of the audio file is obtained based on step S502. When framing is performed on original audio, a frame length is 30 ms, and a frame shift is 15 ms. When windowing is performed, a window function is a Hanning window whose frame length is the same as a frame length of 30 ms. The operation in step S503 is performed on the gray scale data matrix and the original spectrogram. Frequency-domain data in each frame of the original spectrogram includes 1025 pieces of data, and only the $2^{nd}$ to $513^{th}$ pieces of data of the frequency-domain data in each frame of the original spectrogram may be weighted. In this way, all pieces of frequency-domain data may be weighted to obtain the target spectrogram. The $2^{nd}$ to $513^{th}$ pieces of data of frequency-domain data in each frame of the target spectrogram are flipped up and down, and a complex number in flipped frequency-domain data is conjugated. An inverse Fourier transform is performed on the conjugated frequency-domain data in each frame, to obtain a time-domain signal corresponding to the frequency-domain data in each frame. Then, time-domain signals in all frames are synthesized into the target audio according to the aliasing rate. The aliasing rate is a ratio, 15 ms/30 ms, of the frame shift to the frame length, that is, 50%. A finally generated target audio file includes the content created in the creation area. A height of a target spectrogram of the target audio is consistent with a height of a target grayscale image of an embedded two-dimensional image. The target spectrogram of the obtained target audio is viewed by using audio software. Instance effect diagrams are as shown in FIGS. 8A and 8B, in which it can be seen that in the target spectrogram, the two-dimensional image is a part of the target spectrogram, but a height of the two-dimensional image is the same as the height of the target spectrogram from a perspective of a frequency axis, and the magnitude of an energy value of the target spectrogram corresponds to grayscale data of each pixel in the target gray scale image of the two-dimensional image. The generated target audio can be further shared with other users, such that the effect of an audio with the image embedded is shared with friends.

For another example, in music playback software, the user selects an image that the user wants to embed into audio, and also selects an original audio file that the user wants to modify. The processing in step S501 is performed on the image, to obtain a target grayscale image, where a height of the target grayscale image is scaled to include $2^10+1$ pixels. In addition, an original spectrogram of the original audio file is obtained based on step S503. When framing is performed on original audio, a frame length is 40 ms, and a frame shift is 20 ms. When windowing is performed, a length of a window function is a Hanning window whose frame length is the same as a frame length of 40 ms. The operation in step S504 is performed on a grayscale data matrix and the original spectrogram. If an original grayscale data matrix has a size of 1025*1025, the grayscale data matrix changes the size to 513*513 after downsampling, frequency-domain data in each frame of the original spectrogram includes 1025 pieces of data, and part of the frequency-domain data in the spectrogram is weighted. For example, if the grayscale data matrix has a size of 513*513 after downsampling, the $100^{th}$ to $612^{th}$ pieces of data of the frequency-domain data may be weighted, to obtain a target spectrogram. In the obtained target spectrogram, only the $100^{th}$ to $612^{th}$ pieces of data of the frequency-domain data include image information. The $100^{th}$ to $612^{th}$ pieces of data may be other pieces of consecutive frequency-domain data, such as the $200^{th}$ to $712^{th}$ pieces of data, or the $313^{th}$ to $825^{th}$ pieces of data. The target spectrogram is processed based on steps S505 and S506, in which because a real-number signal is conjugate symmetric, the $2^{nd}$ to $512^{th}$ pieces of data of frequency-domain data in each frame of the target spectrogram are flipped up and down, and a complex number in flipped frequency-domain data is conjugated. An inverse Fourier transform is performed on the conjugated frequency-domain data in each frame, to obtain a time-domain signal corresponding to the frequency-domain data in each frame. Then, time-domain signals in all frames are synthesized into the target audio according to the aliasing rate. The aliasing rate is a ratio, 20 ms/40 ms, of the frame shift to the frame length, that is, 50%. A finally generated target audio file includes information about an imported image, and a target spectrogram of the target audio has a height inconsistent with that of the embedded image. By viewing the obtained target spectrogram of the target audio through audio software, it can be seen that in the target spectrogram, the image is a part of the target spectrogram, the height of the image is only part of a height of the target spectrogram from a perspective of a frequency axis, and the magnitude of an energy value of the target spectrogram corresponds to grayscale data of each pixel in the image. The generated target audio can be further shared with other users, such that the effect of an audio with the image embedded is shared with friends.

For another example, by using the method in this embodiment of the present application, multiple two-dimensional images (for example, multiple two-dimensional images in one video, or multiple gesture images acquired in real time) may be obtained and used as two-dimensional images that need to be embedded into original audio. Specifically, a grayscale difference between two-dimensional images corresponding to adjacent acquisition times in the multiple two-dimensional images may be respectively calculated, to obtain multiple grayscale differences; the multiple grayscale differences may be arranged according to acquisition times corresponding to the grayscale differences, to obtain a target gray scale image; and then, frequency-domain data of each pixel in the original spectrogram corresponding to the original audio may be processed by using grayscale data of each pixel in the target grayscale image, to obtain a target spectrogram. For example, three two-dimensional images are obtained. Target grayscale images M1, M2, and M3 corresponding to the three two-dimensional images are obtained based on the operation in step S102, and a difference is made between target grayscale images of two two-dimensional images acquired at adjacent times, to obtain two grayscale differences: M2−M1 and M3−M2. The two grayscale differences are arranged in a time sequence, to obtain target grayscale images corresponding to the multiple two-dimensional images. Then, the original spectrogram of the original audio is obtained based on step S502, and the frequency-domain data of the original spectrogram is weighted by using the target grayscale image as a weighting factor based on the operation in step S503, to obtain the target spectrogram, and then obtain the target audio based on the target spectrogram. According to such a method, the original audio can be modified by using multiple two-dimensional images, so that the original audio presents changing image information in the video.

Refer to FIG. 9, which is a schematic flowchart of another audio generation method according to an embodiment of the present application. As shown in FIG. 9, in the audio generation method, a target spectrogram of audio is established (constructed) based on a target grayscale image of a two-dimensional image, to obtain target audio. The method includes steps S901 to S903 as follows.

In S901, an audio generation instruction input by a user is received, and a target grayscale image of the two-dimensional image is obtained in response to the audio generation instruction.

For descriptions of this step, reference may be made to related descriptions of steps S101 and S102, which will not be repeated herein.

In S902, grayscale data matrix is flipped up and down, and a flipped grayscale data matrix is used as frequency-domain data of each pixel in a spectrogram, to obtain the target spectrogram.

Flipping the grayscale data matrix up and down may indicate flipping the grayscale data matrix up and down in a Y-axis direction. For example, if the grayscale data matrix is (0.1, 0.2, 0.3; 0.4, 0.5, 0.6; 0.7, 0.8, 0.9), grayscale data matrix flipped up and down is (0.7, 0.8, 0.9; 0.4, 0.5, 0.6; 0.1, 0.2, 0.3).

In an implementation, the flipped grayscale data matrix is used as frequency-domain data of each pixel in the target spectrogram. In other words, data of the grayscale data matrix is used as data of a pixel at a corresponding location in the target spectrogram, that is, an energy value corresponding to each pixel in the target spectrogram. The energy value may be represented by a color in the target spectrogram. For example, the magnitudes of different energy values are represented by the shades of color or by different hues of color, which is not limited herein. Optionally, when the grayscale data matrix is used as the frequency-domain data, a larger value of the grayscale data matrix indicates a larger energy value of the corresponding target spectrogram. For example, it is assumed that a larger energy value is represented by a darker color in the obtained target spectrogram. If the grayscale data matrix GrayP3 is (0.7, 0.8, 0.9; 0.4, 0.5, 0.6; 0.1, 0.2, 0.3), after 0.9 is used as frequency-domain data at a corresponding location in the spectrogram, a corresponding energy value is greater than an energy value of data that has a grayscale value less than 0.9 and that is converted into frequency-domain data, so that in the obtained target spectrogram, the location corresponding to 0.9 has a darker color than locations corresponding to other pieces of data. In this way, such a color shade relationship may be used to represent an embedded two-dimensional image in the target spectrogram. Alternatively, when the grayscale data matrix is used as frequency-domain data, a smaller value of the grayscale data matrix may also indicate a larger energy value of a corresponding target spectrogram. For example, it is assumed that a larger energy value is represented by a darker color in the obtained target spectrogram. If the grayscale data matrix GrayP3 is (0.7, 0.8, 0.9; 0.4, 0.5, 0.6; 0.1, 0.2, 0.3), (0.3, 0.2, 0.1; 0.6, 0.5, 0.4; 0.9, 0.8, 0.7) may be obtained according to a formula 1-GrayP3. Therefore, after 0.9 is used as frequency-domain data at a corresponding location in the spectrogram, a corresponding energy value is less than an energy value of data that has a value less than 0.9 and that is converted into frequency-domain data, so that in the obtained target spectrogram, the location corresponding to 0.9 has a lighter color than locations corresponding to other pieces of data. In this way, such a color shade relationship may be used to represent an embedded two-dimensional image in the target spectrogram. Optionally, the magnitude of the value of the grayscale data matrix may be adjusted by using a factor of proportionality, to adjust the magnitude of the energy value of the obtained target spectrogram. For example, if the flipped grayscale data matrix GrayP3 is (0.7, 0.8, 0.9; 0.4, 0.6; 0.1, 0.2, 0.3) and a value of the factor of proportionality is 1.1, the gray scale data matrix becomes (0.77, 0.88, 0.99; 0.44, 0.55, 0.66; 0.11, 0.22, 0.33).

In S903, target audio corresponding to the target spectrogram is generated by using the target spectrogram.

For descriptions of this step, reference may be made to step S104, in which the target spectrogram is obtained in this embodiment by means of directly using the grayscale data matrix as frequency-domain data of the target spectrogram, instead of weighting the original spectrogram by using the grayscale data matrix. Therefore, when time-domain signals in all frames are aliased and concatenated according to an aliasing rate, only an aliasing rate needs to be selected from 0 to 100% (excluding 100%) for aliasing, such that a complete audio signal can be obtained. This audio signal is the target audio.

In this embodiment of the present application, upon obtaining the target spectrogram, the grayscale data matrix of the target grayscale image is used as frequency-domain data, to obtain the target spectrogram; a Fourier transform is performed on frequency-domain data in each frame of the target spectrogram, to obtain a time-domain signal; and time-domain signals are then aliased and concatenated, to finally obtain a target audio file. In other words, the target audio is obtained by constructing the target spectrogram. If the embedded two-dimensional image is multiple two-dimensional images for acquisition of a user action change, a sound effect brought about by changes in features of the multiple two-dimensional images may be obtained. It can be learned that obtaining the target audio by constructing the spectrogram makes it possible that the audio is embedded with image information, so that the image has a sounding function, and the audio may also include image information, thereby greatly increasing the relevance between the audio and the image. Hereinafter, by taking the case where the method proposed in this embodiment of the present application is applied to music playback software and the embedded image is a gesture image that constantly changes in a video stream as an example, the method in this embodiment is explained. In music playback software, if a user photographs an image at a fixed photographing location by using a camera, and randomly waves a finger of the user in front of the camera, the video stream includes multiple gesture images. A first gesture image and a second gesture image are acquired at an interval of 100 ms; processing in step S201 is performed on the first gesture image and the second gesture image, to obtain target grayscale images corresponding to the first gesture image and the second gesture image; a grayscale difference between the target grayscale images for the first gesture image and the second gesture image is calculated; and target grayscale images corresponding to the multiple gesture images are determined based on the grayscale difference. For example, if a grayscale data matrix of the first gesture image is (0.1, 0.2, 0.3; 0.4, 0.5, 0.6; 0.7, 0.8, 0.9), and a grayscale data matrix of the second gesture image is (0.11, 0.23, 0.34; 0.48, 0.56, 0.64; 0.78, 0.92), a grayscale difference between the grayscale data matrix of the first gesture image and the grayscale data matrix of the second gesture image is (0.01, 0.02, 0.04; 0.08, 0.04; 0.08, 0.09, 0.02). The grayscale data matrix is flipped up and down; and the flipped grayscale data matrix is used as frequency-domain data of the target spectrogram, to obtain the target spectrogram. A mapping relationship in which a larger value of the grayscale data matrix indicates a larger energy value of a corresponding target spectrogram is selected. In addition, if the magnitude of the value of the grayscale data matrix is adjusted by using a factor of proportionality of 1.1, an obtained grayscale data matrix is (0.011, 0.022, 0.088, 0.066, 0.044; 0.088, 0.099, 0.022). It can be learned that the magnitude of the energy value of the target spectrogram may be adjusted by adjusting the grayscale data matrix. An operation in step S104 is performed on the target spectrogram, and time-domain signals in all frames are concatenated according to an aliasing rate 60%, to obtain the target audio.

Optionally, the foregoing operations may be performed in the video stream multiple times, so that audio with multiple gesture changes may be perceived in the constructed target audio. For example, there are multiple gesture images in the video stream, and all images are acquired at an interval of 100 ms. After processing in step S201, grayscale data matrices T1, T2, T3, and T4 are obtained, and grayscale differences T2−T1=T12, T3−T2=T23, and T4−T3=T34 are thus generated. T12, T23, and T34 are arranged in a time sequence, and are mapped into a target spectrogram, to obtain, through synthesis, a segment of consecutive audio brought about by gesture changes. According to the method, the obtained audio reflects a sound effect brought about by a change in a dynamic image in the video, and the generated audio can be further shared with other users, such that a special sound effect brought about by a dynamic change is shared with friends.

It can be understood that the foregoing method embodiments are all illustrations of the audio generation method of the present application. The embodiments are emphasized differently. For a part of an embodiment that is not described in detail, reference may be made to related descriptions of other embodiments.

Figure 10:
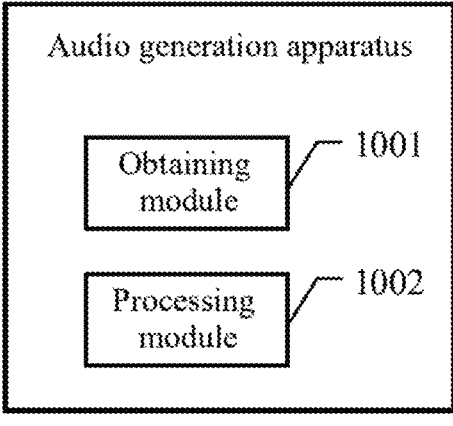
FIG. 10 is a schematic structural diagram of an audio generation apparatus according to an embodiment of the present application.

Based on the descriptions of the embodiments of the audio generation method, an embodiment of the present invention further discloses an audio generation apparatus. Optionally, the audio generation apparatus may be a computer program (including program code/program instructions) running on an audio generation device such as a terminal. For example, the audio generation apparatus may execute the methods in FIGS. 1, 5, and 9. Referring to FIG. 10, the audio generation apparatus may run the following modules: an obtaining module 1001 configured to receive an audio generation instruction input by a user, where the audio generation instruction is used to indicate a two-dimensional image that the user wants to embed into generated target audio, where the obtaining module 1001 is further configured to obtain a target grayscale image of the two-dimensional image in response to the audio generation instruction; and a processing module 1002 configured to convert grayscale data of each pixel in the target grayscale image into frequency-domain data of each pixel in a spectrogram, to obtain a target spectrogram, where the processing module 1002 is further configured to generate target audio corresponding to the target spectrogram by using the target spectrogram.

In an implementation, the processing module 1002 is further configured to: receive an audio selection instruction input by the user, where the audio selection instruction is used to indicate original audio required to generate the target audio, and obtain an original spectrogram corresponding to the original audio in response to the audio selection instruction. When converting the grayscale data of each pixel in the target grayscale image into the frequency-domain data of each pixel in the spectrogram, to obtain the target spectrogram, the processing module may be specifically configured to: process frequency-domain data of each pixel in the original spectrogram by using the grayscale data of each pixel in the grayscale image, to obtain the target spectrogram.

In still another implementation, the grayscale data of each pixel is a grayscale data matrix, and when processing the frequency-domain data of each pixel in the original spectrogram by using the grayscale data of each pixel in the target grayscale image, to obtain the target spectrogram, the processing module 1002 is specifically configured to: flip the gray scale data matrix up and down; and weight the frequency-domain data of each pixel in the original spectrogram by using a flipped grayscale data matrix as a weighting factor, to obtain the target spectrogram.

In still another implementation, the grayscale data of each pixel is a grayscale data matrix, and when processing the frequency-domain data of each pixel in the original spectrogram by using the grayscale data of each pixel in the target grayscale image, to obtain the target spectrogram, the processing module 1002 is specifically configured to: flip the grayscale data matrix up and down, and downsample a flipped grayscale data matrix; and weight part of frequency-domain data of the original spectrogram by using a downsampled grayscale data matrix as a weighting factor, to obtain the target spectrogram.

In still another implementation, the grayscale data of each pixel is a grayscale data matrix, and when converting the grayscale data of each pixel in the target grayscale image into the frequency-domain data of each pixel in the spectrogram, to obtain the target spectrogram, the processing module 1002 is specifically configured to: flip the grayscale data matrix up and down, and use a flipped grayscale data matrix as the frequency-domain data of each pixel in the spectrogram, to obtain the target spectrogram.

In still another implementation, when generating the target audio corresponding to the target spectrogram by using the target spectrogram, the processing module 1002 is specifically configured to: flip frequency-domain data in each frame of the target spectrogram up and down, and conjugate a complex number in flipped frequency-domain data; and perform an inverse Fourier transform on conjugated frequency-domain data in each frame, to obtain a time-domain signal corresponding to the frequency-domain data in each frame, and synthesize time-domain signals in all frames into the target audio.

In still another implementation, when obtaining the target grayscale image of the two-dimensional image, the processing module 1002 is specifically configured to: obtain an original grayscale image of the two-dimensional image, and uniformly scale the original grayscale image, to obtain a uniformly scaled grayscale image; and normalize the uniformly scaled grayscale image, to obtain the target grayscale image of the two-dimensional image.

In still another implementation, the two-dimensional image includes multiple two-dimensional images for acquisition of a user action change; and when obtaining the grayscale image of the two-dimensional image, the processing module 1002 is specifically configured to: respectively calculate a grayscale difference between two-dimensional images corresponding to adjacent acquisition times in the multiple two-dimensional images, to obtain multiple grayscale differences; and arrange the multiple grayscale differences according to acquisition times corresponding to the grayscale differences, to obtain the target gray scale image.

In still another implementation, the processing module 1002 is further configured to: receive an audio playback instruction input by the user; and play the target audio in response to the audio playback instruction, and display, according to a playback progress of the target audio, a target spectrogram with an area corresponding to the playback progress.

According to an embodiment of the present invention, various steps involved in the methods shown in FIGS. 1, 5, and 9 may be performed by various modules in the audio generation apparatus shown in FIG. 10. For example, steps S101 and S102 shown in FIG. 1 may be performed by the obtaining module 1001 shown in FIG. 10, and steps S103 and S104 may be performed by the processing module 1002 shown in FIG. 10.

According to another embodiment of the present invention, all modules in the audio generation apparatus shown in FIG. 10 may be separately or completely combined into one or more other modules, or one (or more) of the modules may be further split into multiple modules that are functionally smaller. In this way, same operations may be implemented, without affecting the implementation of the technical effect of the embodiments of the present invention. The foregoing modules are obtained through division based on logical functions. In actual application, a function of one module may also be implemented by multiple modules, or functions of multiple modules may be implemented by one module. In other embodiments of the present invention, the audio generation apparatus may also include other modules. In actual application, these functions may also be implemented with the assistance of other modules, and may be implemented by multiple modules through collaboration.

In the embodiments of the present application, when the audio generation instruction is received, the target grayscale image of the two-dimensional image that the user wants to embed into the generated target audio can be obtained in response to the audio generation instruction, and the grayscale data of each pixel in the target grayscale image can be converted into the frequency-domain data of each pixel in the spectrogram, to obtain the target spectrogram. In other words, the two-dimensional image is associated with the target spectrogram of the target audio, and then target audio corresponding to the target spectrogram is generated by using the target spectrogram. In this way, the target audio is generated based on the two-dimensional image. It can be learned that in the embodiments of the present application, audio can be embedded with image information, so that an image has a sounding function, and the audio may also include the image information, thereby greatly increasing the relevance between the audio and the image.

Figure 11:
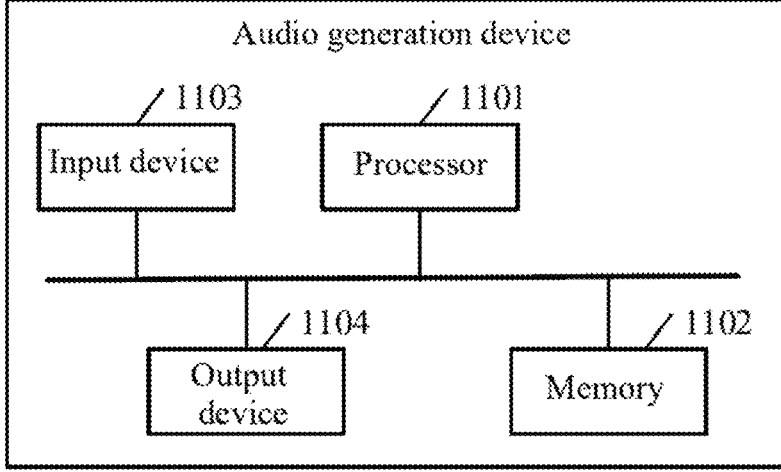
FIG. 11 is a schematic structural diagram of an audio generation device according to an embodiment of the present application.

Based on the descriptions of the method embodiments and the apparatus embodiment, an embodiment of the present invention further provides an audio generation device. Referring to FIG. 11, the device includes at least a processor 1101 and a memory 1102, where the processor 1101 and the memory 1102 are connected to each other. Optionally, the audio generation device may further include an input device 1103 and/or an output device 1104. The processor 1101, the input device 1103, the output device 1104, and the memory 1102 may be connected to each other via a bus or in other manners.

The memory 1102 may be configured to store a computer program (or may be configured to store a computer (readable) storage medium including a computer program), where the computer program includes program instructions, and the processor 1101 is configured to invoke the program instructions. The processor 1101 (or referred to as a central processing unit (CPU) is a computing core and a control core of the device, is configured to invoke the program instructions, and is specifically adapted to load and execute the program instructions to implement the above method procedure or corresponding functions. The input device 1103 may include one or more of a keyboard, a touchscreen, a radio frequency receiver, or other input devices. The output device 1104 may include a display screen (display), and the output device 1104 may further include one or more of a speaker, a radio frequency transmitter, or other output devices. Optionally, the device may further include a memory module, a power supply module, an application client, etc.

For example, in an embodiment, the processor 1101 described in this embodiment of the present invention may be configured to perform a series of audio generation processing, including: receiving an audio generation instruction input by a user, where the audio generation instruction is used to indicate a two-dimensional image that the user wants to embed into generated target audio; obtaining a grayscale image of the two-dimensional image in response to the audio generation instruction; converting grayscale data of each pixel in the grayscale image into frequency-domain data of each pixel in a spectrogram, to obtain a target spectrogram; and generating target audio corresponding to the target spectrogram by using the target spectrogram, etc. For details, reference may be made to the descriptions of the foregoing embodiments, which will not be repeated herein.

An embodiment of the present invention further provides a computer (readable) storage medium, which may be a memory device in a device and is configured to store programs and data. It can be understood that the computer storage medium herein may include a built-in storage medium in the device, and certainly may also include an extended storage medium supported by the device. The computer storage medium provides storage space, in which an operating system of an audio generation device, such as a terminal, is stored. In addition, in the storage space, program instructions adapted to be loaded and executed by the processor 1101 are further stored, and the instructions may be one or more computer programs (including program code). It should be noted that the computer storage medium herein may be a high-speed RAM memory, or may be a nonvolatile memory 11, for example, at least one magnetic disk memory. Optionally, the computer storage medium may also be at least one computer storage medium located far away from the processor 1101.

In an embodiment, the program instructions in the computer storage medium may be loaded and executed by the processor 1101 to implement corresponding steps of the method in the foregoing embodiments. For example, during specific implementation, the program instructions in the computer storage medium are loaded by the processor 1101 to execute the following steps: receiving an audio generation instruction input by a user, where the audio generation instruction is used to indicate a two-dimensional image that the user wants to embed into generated target audio; obtaining a target grayscale image of the two-dimensional image in response to the audio generation instruction; converting grayscale data of each pixel in the target grayscale image into frequency-domain data of each pixel in a spectrogram, to obtain a target spectrogram; and generating target audio corresponding to the target spectrogram by using the target spectrogram.

In an implementation, the program instructions may be further loaded by the processor 1101 to execute the following step: receiving an audio selection instruction input by the user, where the audio selection instruction is used to indicate original audio required to generate the target audio, and obtaining an original spectrogram corresponding to the original audio in response to the audio selection instruction. When converting the grayscale data of each pixel in the target grayscale image into frequency-domain data of each pixel in the spectrogram, to obtain the target spectrogram, the program instructions may be further loaded by the processor 1101 to specifically execute the following step: processing frequency-domain data of each pixel in the original spectrogram by using the grayscale data of each pixel in the target grayscale image, to obtain the target spectrogram.

In still another implementation, the grayscale data of each pixel is a grayscale data matrix, and when processing the frequency-domain data of each pixel in the original spectrogram by using the grayscale data of each pixel in the target grayscale image, to obtain the target spectrogram, the program instructions may be further loaded by the processor 1101 to specifically execute the following steps: flipping the grayscale data matrix up and down; and weighting the frequency-domain data of each pixel in the original spectrogram by using a flipped grayscale data matrix as a weighting factor, to obtain the target spectrogram.

In still another implementation, the grayscale data of each pixel is a grayscale data matrix, and when processing the frequency-domain data of each pixel in the original spectrogram by using the grayscale data of each pixel in the target grayscale image, to obtain the target spectrogram, the program instructions may be further loaded by the processor 1101 to specifically execute the following steps: flipping the grayscale data matrix up and down, and downsampling a flipped grayscale data matrix; and weighting the frequency-domain data of each pixel in the original spectrogram by using a downsampled grayscale data matrix as a weighting factor, to obtain the target spectrogram.

In still another implementation, the grayscale data of each pixel is a grayscale data matrix, and when converting the grayscale data of each pixel in the target grayscale image into the frequency-domain data of each pixel in the spectrogram, to obtain the target spectrogram, the program instructions may be further loaded by the processor 1101 to specifically execute the following step: flipping the grayscale data matrix up and down, and using a flipped grayscale data matrix as the frequency-domain data of each pixel in the spectrogram, to obtain the target spectrogram.

In still another implementation, when generating the target audio corresponding to the target spectrogram by using the target spectrogram, the program instructions may be further loaded by the processor 1101 to specifically execute the following steps: flipping frequency-domain data in each frame of the target spectrogram up and down, and conjugating a complex number in flipped frequency-domain data; and performing an inverse Fourier transform on conjugated frequency-domain data in each frame, to obtain a time-domain signal corresponding to the frequency-domain data in each frame, and synthesizing time-domain signals in all frames into the target audio.

In still another implementation, when obtaining the target grayscale image of the two-dimensional image, the program instructions may be further loaded by the processor 1101 to specifically execute the following steps: obtaining an original grayscale image of the two-dimensional image, and uniformly scaling the original grayscale image, to obtain a uniformly scaled grayscale image; and normalizing the uniformly scaled grayscale image, to obtain the target grayscale image of the two-dimensional image.

In still another implementation, the two-dimensional image includes multiple two-dimensional images for acquisition of a user action change, and when obtaining the target grayscale image of the two-dimensional image, the program instructions may be further loaded by the processor 1101 to specifically execute the following steps: respectively calculating a grayscale difference between two-dimensional images corresponding to adjacent acquisition times in the multiple two-dimensional images, to obtain multiple grayscale differences; and arranging the multiple grayscale differences according to acquisition times corresponding to the grayscale differences, to obtain the target grayscale image.

In still another implementation, the program instructions may be further loaded by the processor 1101 to specifically execute the following steps: receiving an audio playback instruction input by the user; and playing the target audio in response to the audio playback instruction, and displaying, according to a playback progress of the target audio, a target spectrogram with an area corresponding to the playback progress.

In the embodiments of the present application, when the audio generation instruction is received, the target grayscale image of the two-dimensional image that the user wants to embed into the generated target audio can be obtained in response to the audio generation instruction, and the grayscale data of each pixel in the target grayscale image can be converted into the frequency-domain data of each pixel in the spectrogram, to obtain the target spectrogram. In other words, the two-dimensional image is associated with the target spectrogram of the target audio, and then target audio corresponding to the target spectrogram is generated by using the target spectrogram. In this way, the target audio is generated based on the two-dimensional image. It can be learned that in the embodiments of the present application, audio can be embedded with image information, so that an image has a sounding function, and the audio may also include the image information, thereby greatly increasing the relevance between the audio and the image.

It can be understood that for a specific working process of the audio generation device and apparatus described above, reference may be made to related descriptions of the foregoing embodiments, which will not be repeated herein.

Those of ordinary skill in the art may understand that all or part of the procedure in the methods in the foregoing embodiments may be completed by a computer program instructing related hardware. The program may be stored in a computer storage medium. The computer storage medium may be a computer-readable storage medium. When executed, the program may include the procedure in the embodiments of the methods described above. The storage medium may be a magnetic disk, an optical disc, a read-only memory (ROM), or a random access memory (RAM), etc.

The foregoing disclosed embodiments are merely some embodiments of the present application, and are not intended to limit the scope of protection of the present application. Those of ordinary skill in the art may understand that all or part of the procedure of the embodiments are implemented, and equivalent variations made according to the claims of the present application shall fall within the scope of the present invention.

What is claimed is:

1. An audio generation method, comprising:
receiving an audio generation instruction input by a user, wherein the audio generation instruction is used to indicate a two-dimensional image that the user wants to embed into generated target audio;
obtaining a target grayscale image of the two-dimensional image in response to the audio generation instruction;

converting grayscale data of each pixel in the target grayscale image into frequency-domain data of each pixel in a spectrogram, to obtain a target spectrogram; and generating target audio corresponding to the target spectrogram by using the target spectrogram, wherein the method further comprises:

receiving an audio selection instruction input by the user, wherein the audio selection instruction is used to indicate original audio required to generate the target audio, and obtaining an original spectrogram corresponding to the original audio in response to the audio selection instruction, and wherein converting the grayscale data of each pixel in the target grayscale image into the frequency-domain data of each pixel in the spectrogram, to obtain the target spectrogram comprises:

processing frequency-domain data of each pixel in the original spectrogram by using the grayscale data of each pixel in the target grayscale image, to obtain the target spectrogram.

2. The method according to claim 1, wherein the grayscale data of each pixel is a grayscale data matrix, and wherein processing the frequency-domain data of each pixel in the original spectrogram by using the grayscale data of each pixel in the target grayscale image, to obtain the target spectrogram comprises:

flipping the grayscale data matrix up and down; and weighting the frequency-domain data of each pixel in the original spectrogram by using a flipped grayscale data matrix as a weighting factor, to obtain the target spectrogram.

3. The method according to claim 1, wherein the grayscale data of each pixel is a grayscale data matrix, and wherein processing the frequency-domain data of each pixel in the original spectrogram by using the grayscale data of each pixel in the target grayscale image, to obtain the target spectrogram comprises:

flipping the grayscale data matrix up and down, and downsampling a flipped grayscale data matrix; and weighting the frequency-domain data of each pixel in the original spectrogram by using a downsampled grayscale data matrix as a weighting factor, to obtain the target spectrogram.

4. The method according to claim 1, wherein the grayscale data of each pixel is a grayscale data matrix, and wherein converting the grayscale data of each pixel in the target grayscale image into the frequency-domain data of each pixel in the spectrogram, to obtain the target spectrogram comprises:

flipping the grayscale data matrix up and down, and using a flipped grayscale data matrix as the frequency-domain data of each pixel in the spectrogram, to obtain the target spectrogram.

5. The method according to claim 1, wherein generating the target audio corresponding to the target spectrogram by using the target spectrogram comprises:

flipping frequency-domain data in each frame of the target spectrogram up and down, and conjugating a complex number in flipped frequency-domain data; and performing an inverse Fourier transform on conjugated frequency-domain data in each frame, to obtain a time-domain signal corresponding to the frequency-domain data in each frame, and synthesizing time-domain signals in all frames into the target audio.

6. The method according to claim 1, wherein obtaining the target grayscale image of the two-dimensional image comprises:

obtaining an original grayscale image of the two-dimensional image, and uniformly scaling the original grayscale image, to obtain a uniformly scaled grayscale image; and normalizing the uniformly scaled grayscale image, to obtain the target grayscale image of the two-dimensional image.

7. The method according to claim 1, wherein the two-dimensional image comprises a plurality of two-dimensional images for acquisition of a user action change; and wherein obtaining the target grayscale image of the two-dimensional image comprises:

calculating a grayscale difference between two-dimensional images corresponding to adjacent acquisition times in the plurality of two-dimensional images respectively, to obtain a plurality of grayscale differences; and arranging the plurality of grayscale differences according to acquisition times corresponding to the grayscale differences, to obtain the target grayscale image.

8. The method according to claim 1, wherein the method further comprises:

receiving an audio playback instruction input by the user; and playing the target audio in response to the audio playback instruction, and displaying, according to a playback progress of the target audio, a target spectrogram with an area corresponding to the playback progress.

9. An audio generation device, comprising:

a memory configured to store computer programs; and a processor configured to invoke the computer programs stored in the memory to:

receive an audio generation instruction input by a user, wherein the audio generation instruction is used to indicate a two-dimensional image that the user wants to embed into generated target audio;

obtain a target grayscale image of the two-dimensional image in response to the audio generation instruction;

convert grayscale data of each pixel in the target grayscale image into frequency-domain data of each pixel in a spectrogram, to obtain a target spectrogram; and generate target audio corresponding to the target spectrogram by using the target spectrogram, wherein the processor is further configured to:

receive an audio selection instruction input by the user, wherein the audio selection instruction is used to indicate original audio required to generate the target audio, and obtain an original spectrogram corresponding to the original audio in response to the audio selection instruction, and wherein to convert the grayscale data of each pixel in the target grayscale image into the frequency-domain data of each pixel in the spectrogram, to obtain the target spectrogram, the processor is configured to:

process frequency-domain data of each pixel in the original spectrogram by using the grayscale data of each pixel in the target grayscale image, to obtain the target spectrogram.

10. The audio generation device according to claim 9, wherein the grayscale data of each pixel is a grayscale data matrix, and wherein to process the frequency-domain data of each pixel in the original spectrogram by using the grayscale data of each pixel in the target grayscale image, to obtain the target spectrogram, the processor is configured to:

flip the grayscale data matrix up and down; and weight the frequency-domain data of each pixel in the original spectrogram by using a flipped grayscale data matrix as a weighting factor, to obtain the target spectrogram.

11. The audio generation device according to claim 9, wherein the grayscale data of each pixel is a grayscale data matrix, and wherein to process the frequency-domain data of each pixel in the original spectrogram by using the grayscale data of each pixel in the target grayscale image, to obtain the target spectrogram, the processor is configured to:

flip the grayscale data matrix up and down, and downsample a flipped grayscale data matrix; and weight the frequency-domain data of each pixel in the original spectrogram by using a downsampled grayscale data matrix as a weighting factor, to obtain the target spectrogram.

12. The audio generation device according to claim 9, wherein the grayscale data of each pixel is a grayscale data matrix, and wherein to convert the grayscale data of each pixel in the target grayscale image into the frequency-domain data of each pixel in the spectrogram, to obtain the target spectrogram, the processor is configured to:

flip the grayscale data matrix up and down, and use a flipped grayscale data matrix as the frequency-domain data of each pixel in the spectrogram, to obtain the target spectrogram.

13. The audio generation device according to claim 9, wherein to generate the target audio corresponding to the target spectrogram by using the target spectrogram, the processor is configured to:

flip frequency-domain data in each frame of the target spectrogram up and down, and conjugate a complex number in flipped frequency-domain data; and perform an inverse Fourier transform on conjugated frequency-domain data in each frame, to obtain a time-domain signal corresponding to the frequency-domain data in each frame, and synthesize time-domain signals in all frames into the target audio.

14. The audio generation device according to claim 9, wherein to obtain the target grayscale image of the two-dimensional image, the processor is configured to:

obtain an original grayscale image of the two-dimensional image, and uniformly scale the original grayscale image, to obtain a uniformly scaled grayscale image; and normalize the uniformly scaled grayscale image, to obtain the target grayscale image of the two-dimensional image.

15. The audio generation device according to claim 9, wherein the two-dimensional image comprises a plurality of two-dimensional images for acquisition of a user action change; and wherein to obtain the target grayscale image of the two-dimensional image, the processor is configured to:

calculate a grayscale difference between two-dimensional images corresponding to adjacent acquisition times in the plurality of two-dimensional images respectively, to obtain a plurality of grayscale differences; and arrange the plurality of grayscale differences according to acquisition times corresponding to the grayscale differences, to obtain the target grayscale image.

16. The audio generation device according to claim 9, wherein the processor is further configured to:

receive an audio playback instruction input by the user; and play the target audio in response to the audio playback instruction, and display, according to a playback progress of the target audio, a target spectrogram with an area corresponding to the playback progress.

17. A non-transitory computer storage medium comprising computer programs which, when running on an electronic device, are operable with the electronic device to:

receive an audio generation instruction input by a user, wherein the audio generation instruction is used to indicate a two-dimensional image that the user wants to embed into generated target audio;

obtain a target grayscale image of the two-dimensional image in response to the audio generation instruction;

convert grayscale data of each pixel in the target grayscale image into frequency-domain data of each pixel in a spectrogram, to obtain a target spectrogram; and generate target audio corresponding to the target spectrogram by using the target spectrogram, wherein the computer programs are further operable with the electronic device to:

receive an audio selection instruction input by the user, wherein the audio selection instruction is used to indicate original audio required to generate the target audio, and obtain an original spectrogram corresponding to the original audio in response to the audio selection instruction, and wherein to convert the grayscale data of each pixel in the target grayscale image into the frequency-domain data of each pixel in the spectrogram, to obtain the target spectrogram, the computer programs are operable with the electronic device to:

process frequency-domain data of each pixel in the original spectrogram by using the grayscale data of each pixel in the target grayscale image, to obtain the target spectrogram.

* * * * *